United States Patent

[11] 3,624,337

[72] Inventor Harry D. Kauffman
 Cincinnati, Ohio
[21] Appl. No. 95,296
[22] Filed Dec. 4, 1970
[45] Patented Nov. 30, 1971
[73] Assignee Cincinnati Milacron Inc.
 Cincinnati, Ohio

[54] METHOD AND APPARATUS FOR DETECTING AND CONTROLLING THROUGH PULSE ENERGY VARIATIONS ARCING CONDITIONS IN AN EDM PROCESS
 8 Claims, 7 Drawing Figs.

[52] U.S. Cl. ................................................ 219/69 P
[51] Int. Cl. ................................................ B23p 1/08
[50] Field of Search .......................................... 219/69 C,
 69 F, 69 G, 69 P, 69 S

[56] References Cited
 UNITED STATES PATENTS
 3,087,044 4/1963 Inoue ......................... 219/69 P Primary Examiner—R. F. Staubly
Attorneys—Howard T. Keiser and Alfred J. Mangels ABSTRACT: In an EDM process, a method and apparatus for controlling arcing conditions in a machining gap. An apparatus is provided for detecting the presence of a noise signal contained in a discharge. The absence of this noise signal is indicative of an arcing condition which may be detected during any one or a predetermined number of discharges. Upon detection of the absence of said noise signal, corrective action is taken in the power supply which is effective to alleviate the arcing condition.

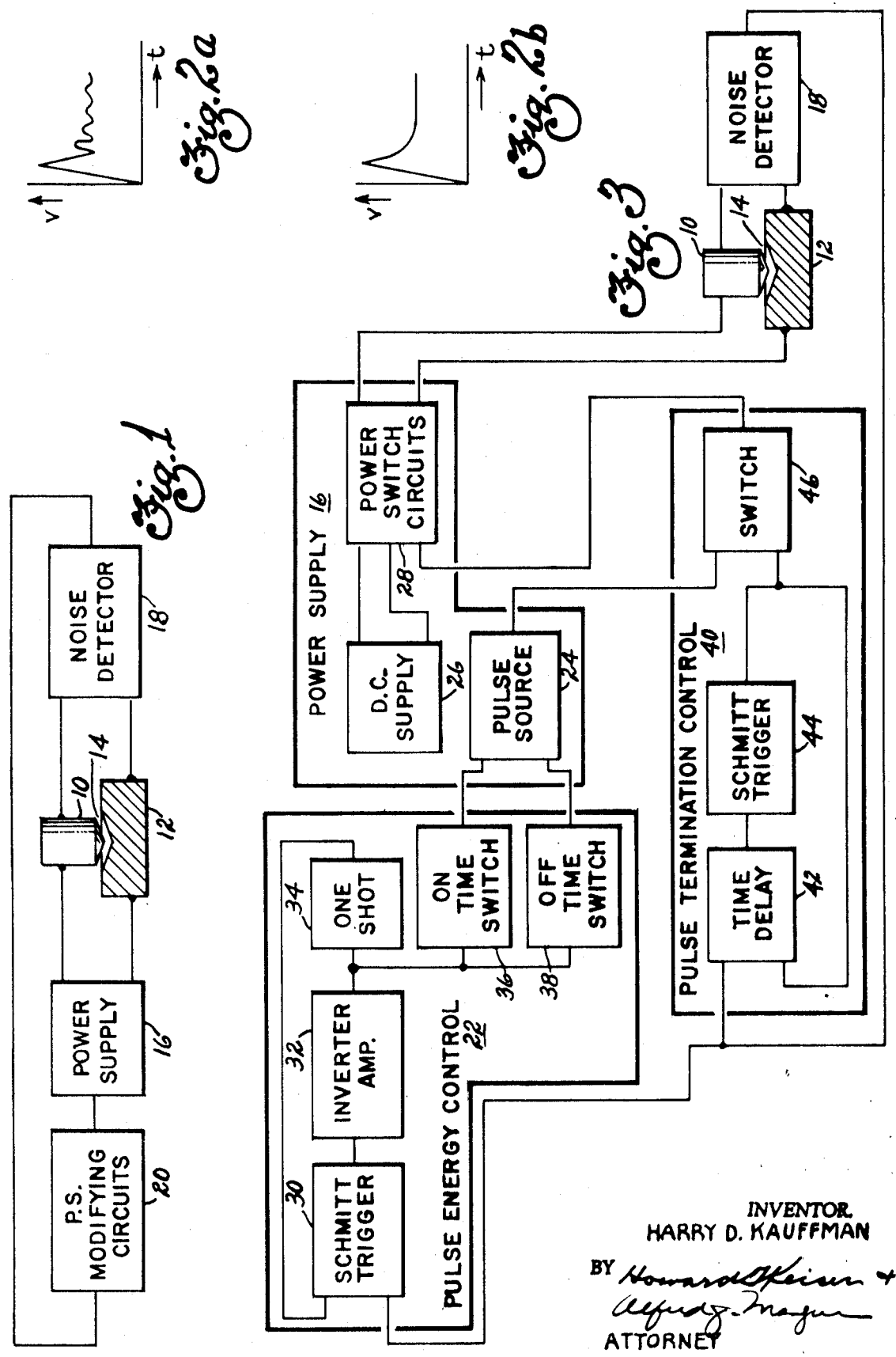

METHOD AND APPARATUS FOR DETECTING AND CONTROLLING THROUGH PULSE ENERGY VARIATIONS ARCING CONDITIONS IN AN EDM PROCESS

BACKGROUND OF THE INVENTION

The invention relates generally to a method and apparatus for improving the automatic control of an electrodischarge machining (EDM) process. Specifically, the invention discloses a method and apparatus for controlling arcing conditions in the machining gap by adjusting output parameters of the power supply. In an EDM process, a power supply provides machining pulses for producing electrical discharges across the machining gap formed in a dielectric medium between an electrically conductive tool and an electrically conductive workpiece. The relative position between said tool and workpiece being controlled by a servomechanism.

One condition causing considerably problems in the EDM process is that of arcing. Although arcing conditions are more prevalent when machining with dielectrics having a high hydrocarbon content, arcing may occur and cause problems at any time. Even though the harmful effects of a sustained arcing condition can be readily detected and observed, there has been no exact determination of all the causes of arcing nor has there been sufficient apparatus developed that is able to detect the development of an arcing condition in its initial stages.

To better understand the arcing process, a review of an ideal EDM process is in order. In the ideal process, the dielectric strength will be assumed constant and uniform across the area of the gap. Under these conditions, the electric field will concentrate at the point of the shortest distance between the tool and workpiece, and hence the discharge will occur across the gap at the point. Metal is removed from the tool and workpiece; and therefore, the next discharge will occur at some other point between the tool and workpiece where the electrical distance is minimal. Hence, the discharges continuously move across the area of the gap removing the highest existing points of the workpiece and eroding it away to form the desired cut defined by the tool configuration. If, for some reason the ideal conditions are disrupted and the discharges do not move from one point to another but continue at one point regardless of the distance between the tool and workpiece, severe damage may occur to the tool or workpiece; and the machining process must be terminated.

This condition is defined as an arc and may readily occur with dielectrics having a high hydrocarbon content. During a particular discharge, the dielectric may break down and form amorphic carbon particles. If these particles are deposited on the tool and workpiece at the point of the discharge, they facilitate the occurrence of the next discharge at this same point regardless of the distance between the tool and workpiece. This same condition can occur when a piece of the graphite is dislodged from the tool and settles in the gap. As the discharges continue at the same point, the deposits continue to build; and the machining process is completely destroyed. The short circuit detection circuitry may or may not detect as severe arcing condition; however, in order to correct the situation, the power supply must be turned off. The tool removed from the workpiece, and the deposits manually removed therefrom. It is readily apparent that the frequency of occurrence as well as the severity of an arcing condition is highly unpredictable. Further, because the arcing current occurs at the same location, a substantial heat concentration exists at that point, which may cause damage to the tool or workpiece as well as operate to perpetuate the arcing condition. Finally, since an arc is not a short circuit but is only a discharge which does not remove any metal, the short circuit detection circuits are really ineffective in controlling arcing conditions.

There have been various attempts at detecting arcing conditions. One of these is to measure the electrical parameters in the gap between the discharges and obtain a signal representing gap impedance. However, such detection circuits must be very sensitive to small changes in these parameters and must have very fast response times since detection must be performed in the relatively small time between discharges. Another system of arcing detection consists of counting the number of discharges in a predetermined period of time and comparing the discharges detected with the number of machining pulses transmitted to the gap during the same time. Finally, the design in some earlier power supply permitted an arcing condition to degenerate into a continuous direct current flow. This current flow would not permit the detection of discharges; and hence the circuit signaled that corrective action was necessary. With a true pulse-type power supply, such a detection scheme is inapplicable.

In order to overcome the inconsistencies and disadvantages of the above systems, applicant proposes to make use of a phenomenon occuring during the discharge to provide an accurate and positive system for detecting and correcting arcing conditions during the machining process. The basic mechanics of the development of the discharge are well known to those who are skilled in the art. Briefly, an initial voltage is applied to the gap. This voltage ionizes or breaks the gap down, and then the voltage drops to a machining level for the duration of the discharge. Applicant has observed a characteristic of the process which occurs during a discharge across the gap and is useful in detecting arcing conditions. This characteristic is the presence of a noise signal on the voltage signal during a discharge. This noise signal appears as an underdamped oscillation during a normal discharge. However, during an arcing condition the noise signal or oscillation is absent from the voltage signal. Since it is not necessary for purposes of this application, applicant will not make an attempt to rationalize this phenomenon. Suffice to say, the phenomenon exists and applicant will use it to provide a substantially improved machining process. The detection of the presence and absence of the oscillation or noise signal provides an accurate and immediate indication of an arcing condition. This detection does not require the level of discrimination necessary for detecting particular levels of current, voltage or impedance. Further, this detection is not dependent on the condition causing the arcing condition. Further, applicant proposes an automatic system for correcting the arcing condition by adjusting the output parameters of the machining pulses from the power supply.

SUMMARY OF THE INVENTION

The invention disclosed provides a method and apparatus for automatically detecting and correcting arcing conditions during an EDM machining process. The machining process often results in an undesirable concentration of impurities in the machining gap. These impurities may operate to upset the inherent natural mechanics of the EDM process. Therefore, a noise signal that occurs during a normal discharge is severely attenuated or completely inhibited. By detecting the absence of this noise signal during a discharge, an immediate and accurate determination of an arcing condition is available. Therefore, in an EDM apparatus comprised in part of a power supply for producing electrical discharges across the machining gap formed in a dielectric medium between a tool and workpiece, the invention comprises a detection circuit for detecting the absence of a noise signal during a discharge which indicates the presence of an arcing condition and an electrical network responsive to the detection circuit and connected to the EDM power supply for modifying the operation of said supply to terminate the arcing condition.

BRIEF DESCRIPTION OF THE DRAWINGS

FIG. 1 is a general block diagram illustrating the invention.

FIGS. 2a and 2b illustrate the presence and absence respectively, of the noise signal as it appears on the voltage signal during a discharge.

FIG. 3 is a detailed block diagram of the preferred embodiment of the invention.

DESCRIPTION OF THE PREFERRED EMBODIMENTS

Figure 4A:
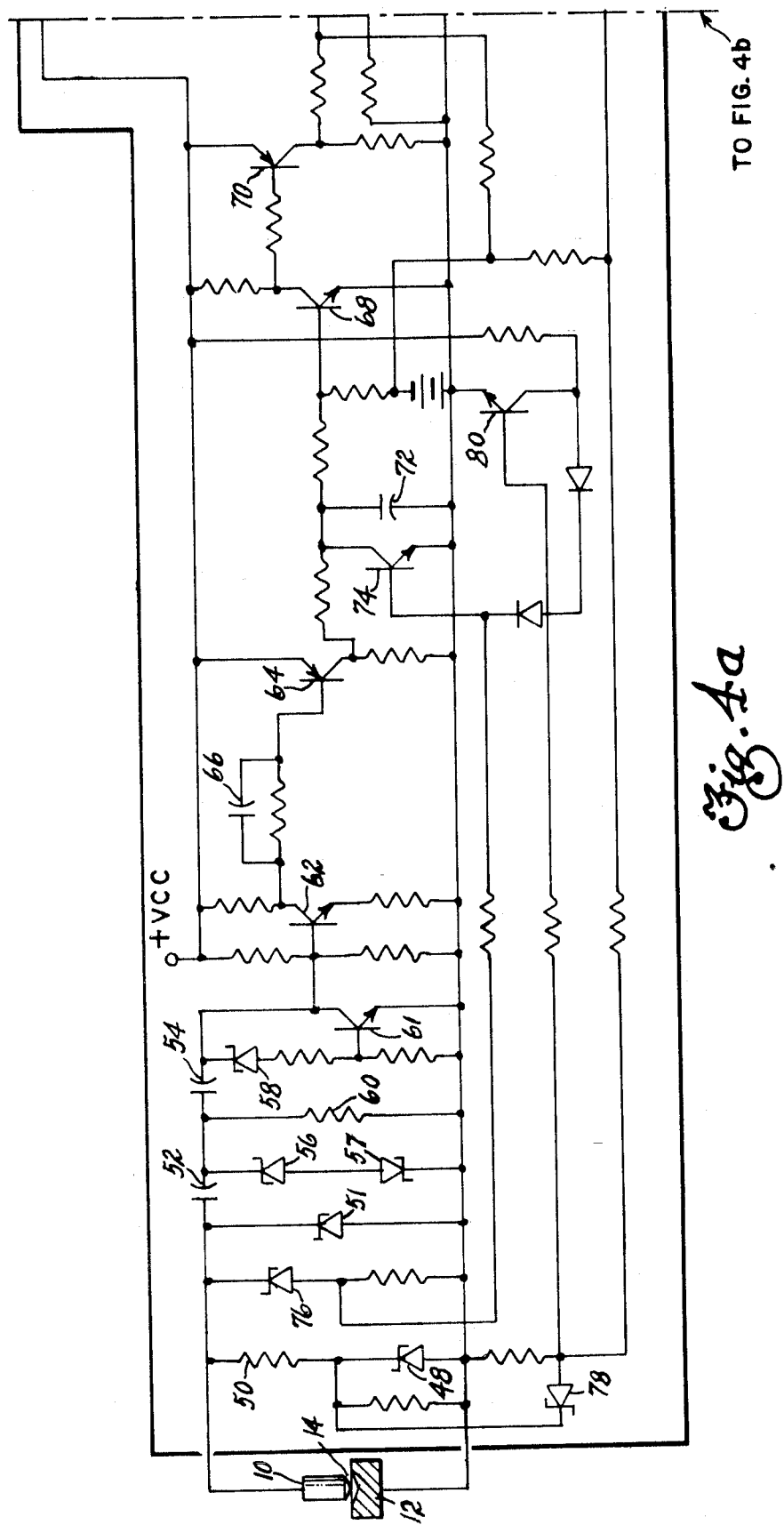
FIGS. 4a, 4b and 4c when joined along the indicated junction lines comprise a detailed schematic diagram of the noise detector and the pulse energy control circuits of the preferred embodiment.

FIG. 1 is a general block diagram illustrating the invention. An electrically conductive tool 10 is positioned adjacent to an electrically conductive workpiece 12 to form a machining gap 14 therebetween. Although it is not shown, said tool position may be controlled by a servomechanism of any standard design. Further, the tool 10 and workpiece 12 are immersed in a dielectric bath or medium again as is well known in the art. In addition, a dielectric flow rate is supplied to the gap 14 in any of the standard ways.

A power supply 16 has an output connected between the tool 10 and workpiece 12. The power supply 16 provides a signal having a voltage characteristic that increases in a steep manner until the gap breaks down or ionizes, and then it drops to a lower machining level for the remainder of the discharge. FIG. 2a illustrates the voltage signal across the machines gap under ideal conditions. Modulated on the signal is a high frequency modulation or noise signal. This signal is present during normal machining conditions. However, during the presence of an arcing condition, the noise signal is dampened out and for all practical purposes disappears. Once the correlation between a noise signal and the presence of an arcing condition is discovered, the problem becomes one of detecting the absence of said noise signal. This may be done in several ways. Applicant has decided to use a discrete component noise detector 18 as shown in FIG. 1. Since the detection of the noise signal is a binary function, it should be understood that there is really no difference between detecting its presence and absence. In other words, the noise signal is either present or it is not present; there is no middle condition. A detector inherently provides both conditions. Once the absence of the noise is detected, the next problem is one of eliminating the arcing condition. Applicant believes the arcing can be eliminated by making appropriate adjustments to the output machining pulses from the power supply 16. This modification may take two forms and is executed by the power supply modifying circuits 20. The first remedial action is to reduce the energy contained in the machining pulses, and the second action is to terminate the machining pulses after a period of time when it is evident the arcing condition is not clearing and permanent damage to the tool or workpiece will occur.

FIG. 3 is a detailed block diagram of the preferred embodiment of the invention. Again, the power supply 16 supplies electrical periodic output machining pulses to the machining gap 14 formed between the tool 10 and workpiece 12. Upon the noise signal disappearing from the voltage signal, the noise detector 18 produces an output signal. This signal is transmitted to the pulse energy control 22 which provides the first step of remedial action.

The power supply 16 is typically comprised of a pulse source 24, a direct current supply 26, and power switching circuits 28. The pulse source 24 is operative to produce a periodic low power pulse output that defines the shape and timing of the machining pulses which are applied to the gap 14. The low power pulses are used to control the power switching circuits 28, which operate to switch the high current output of the DC supply 26. The energy contained in the machining pulses from the power supply 16 is a function of the product of the pulse width and pulse amplitude. Hence, either parameter may be adjusted to control the pulse energy. The pulse amplitude may be controlled by modifying the operation of the direct current supply 26 or the power switching circuits 28. The pulse width may be controlled by modifying the operation of the pulse source 24. The pulse width or time duration of the machining pulse is defined as ON time, and the time duration between machine pulses in defined as OFF time. Therefore, the pulse energy may be reduced by decreasing the ON time and increasing the OFF time of the low power pulses which identically change the machining pulses on the output of the supply 16. Typically, the ON and OFF time adjustment is provided by potentiometers located in the pulse source. The potentiometers may be ganged together on a single control or may be separately adjustable. When the ON and OFF times are to be switched to a predetermined value, an appropriate resistance may be switched into the circuit containing the ON time and OFF time potentiometers. As shown in FIG. 3, the output from the noise detector indicating the absence of a noise signal is input to the Schmidt trigger 30. The Schmidt trigger 30 provides a very fast switching action on its output which is inverted in the inverter amplifier 32, the inverter output is connected to a one-shot multivibrator 34, an ON time switch 36 and an OFF time switch 38. The switches 36 and 38 operate to immediately switch a predetermined resistance in the circuits containing the ON and OFF time potentiometers of the pulse source 24. This operates to immediately reduce the ON time to a predetermined value and to increase the OFF time to a predetermined value thus reducing the pulse energy. Simultaneous with the operation of switches 36 and 38, the multivibrator 34 produces an output pulse which is fed back and holds the Schmidt trigger 30 in its switched state. After a predetermined period of time, the multivibrator output returns to its original condition which removes the input from the Schmidt 30 returning it to its original state. This, in turn, returns the switches 36 and 38 back to their original conditions; and hence, the pulse energy back to its original level. Although it is not shown, a timing potentiometer in the multivibrator 34 may be connected to the ON time potentiometer in the pulse source 24. The connection provides a relationship between the ON time of a pulse source and the length of time the pulse energy is held in its reduced state. In other words, the time duration of the pulse output from the multivibrator 34 is a function of the ON time or pulse energy defined by the setting of the ON time potentiometer.

Figure 4B:
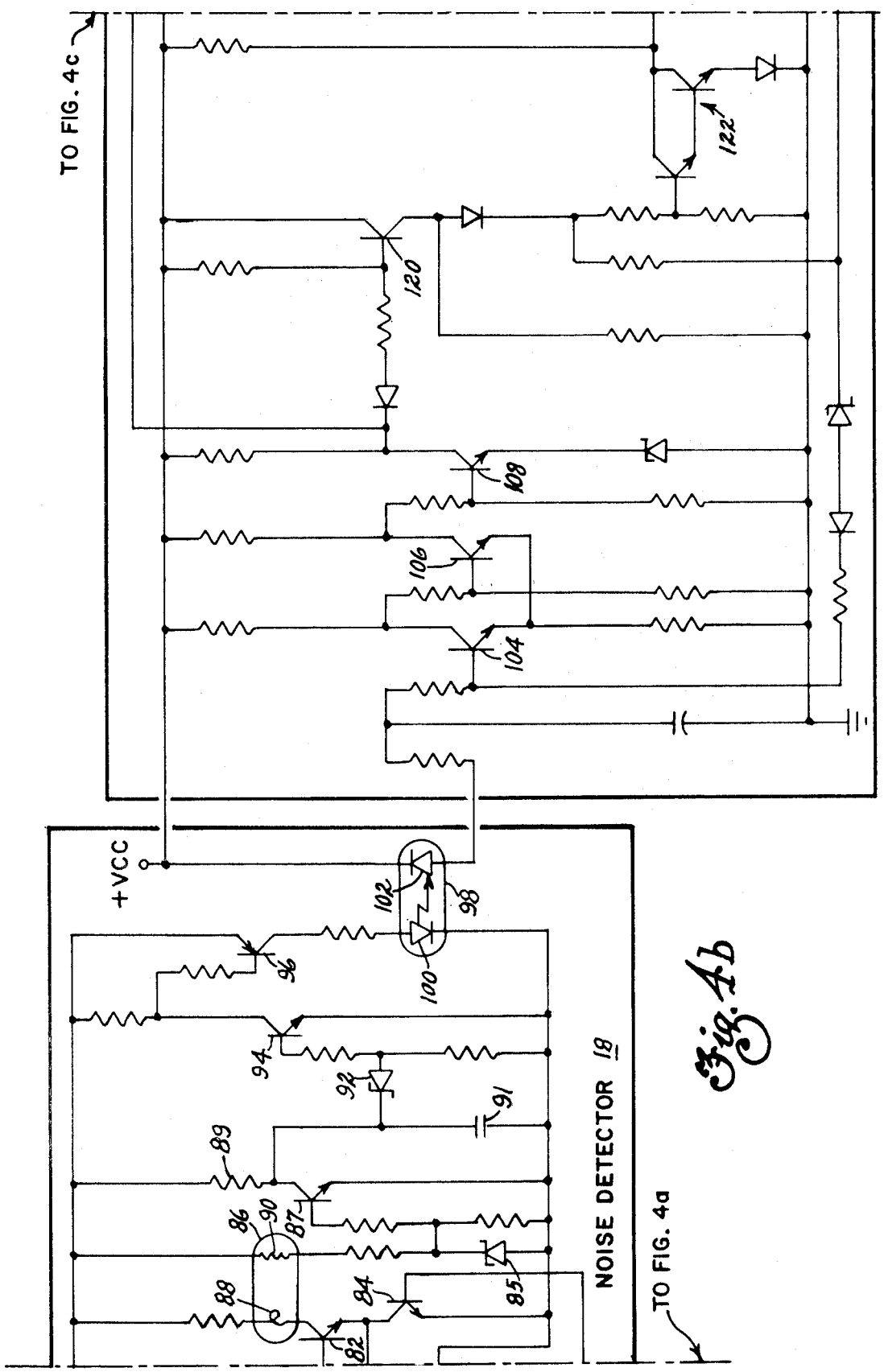
Figure 4C:
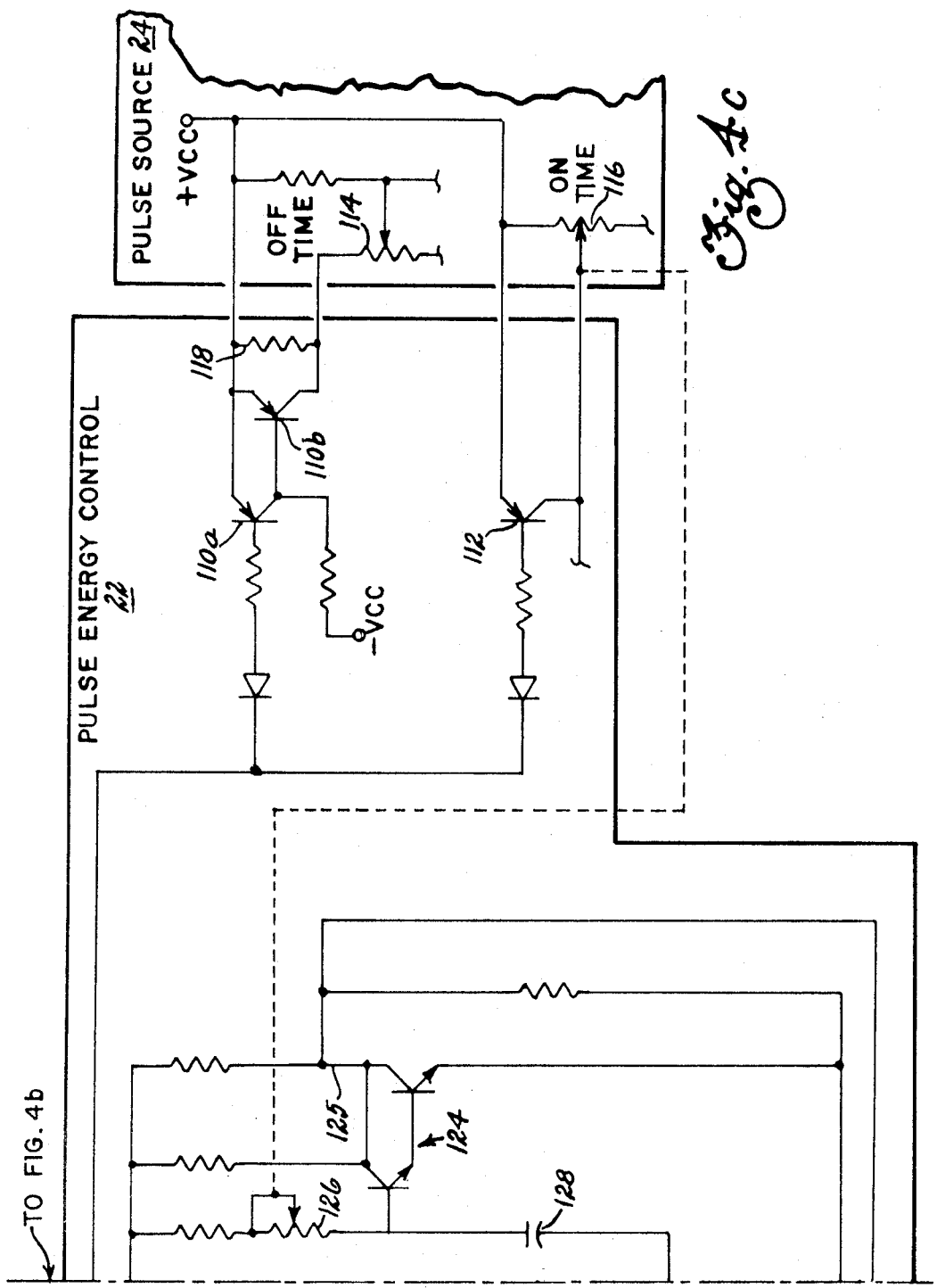

A second form of remedial action is represented by the pulse termination control 40. The circuit is responsive to the continued absence of a noise signal in the voltage signal to terminate the output of machining pulses. There are situations where the arcing condition is so severe that the reduction in pulse energy is not adequate to alleviate the condition. In these cases the arcing condition gradually increases in severity until damage occurs to the tool or workpiece. The object of the pulse termination circuit 40 is to stop the machining process before damage occurs while operating in the reduced energy mode. Therefore, the continuous presence of an output from the noise detector 18 is used to energize the time delay 42. Any discontinuities in the noise detector output causes the time delay to restart its cycle. When the time delay does time out, it produces an output signal which causes the Schmidt trigger 44 to switch and energize the switch 46. The switch 46 is located on the output of the pulse source 24. As it is shown in FIG. 3, the switch 46 is operable to disconnect the pulse source 24 from the power switching circuit 28. In addition, as will be appreciated by those who are skilled in the art, there are many other schemes for using the switch 46 to terminate the output of machining pulses from the power supply 16. It should be noted that the output of the Schmidt trigger 44 is fed back to the time delay input thus locking-in its expired state. Therefore, the only way to relieve the pulse termination condition is by operator intervention. The operator must turn off the power supply, take the appropriate action between the tool and workpiece and restart the machining process. The action of turning off the power supply will cause the time delay 42, the Schmidt trigger 44 and a switch 46 to return to their original conditions. After the operator has taken the proper corrective action, and the power supply is turned back on, the normal machining process can be resumed. FIGS. 4a, 4b and 4c when joined along the indicated junction lines comprise a detailed schematic diagram of the preferred embodiment of the noise detector 18 and pulse energy control 22 which represent the more important areas of this disclosure. In FIG. 4a, the noise detector 18 has inputs connected to the tool 10 and workpiece 12. Across the detector input is the zener diode 48 in series with the resistor 50. The purpose of zener diode 48 is to clamp the gap voltage at a typical maximum value to prevent erratic switching of the other elements in the noise detector. The capacitors 52 and 54 are of a very small value and present a low impedance to signal frequencies in a low megacycle region. These capacitors separate the noise signal from the discharge signal. The zener diodes 56 and 57 will insure that the potential across the resistor 60 never exceeds a predetermined value, e.g. a peak to peak value of 10 volts. The zener diode 58 and transistor 61 constitute a clipping circuit. The voltage of the collector of transistor 61 has a predetermined maximum value determined by the breakdown voltage of the zener diode 58. The noise signal is then input to an amplifier comprised of transistor 62; the output of this amplifier is coupled to an inverter amplifier defined by transistor 64. Again, the capacitor 66 increases the switching speed of transistor 64. The output of transistor 64 is input to a second inverter amplifier combination comprised of transistors 68 and 70. However, the capacitor 72 provides a small time delay between the output of transistor 64 and the input of transistor 68. Several cycles of the noise signal must be detected to charge capacitor 72 to a potential to drive transistor 68 into conduction. This operates to separate the noise signal applicant is trying to detect from any other high frequency transients which are unrelated to the arcing condition. Transistor 74 is used in conjunction with zener diode 76 to provide the appropriate discharge path for capacitor 72. Zener diode 76 has a break down voltage in excess of the normal machining voltage but less than the typical peak breakdown voltage of the gap. Therefore, every time the gap breaks down or ionizes, zener diode 76 provides a signal path that operates to drive transistor 74 into conduction thus discharging capacitor 72. However, when the gap voltage has dropped to a machining level, transistor 74 stops conducting and a discharge path is closed. This circuit operates as described under normal machining conditions; however, a check circuit is provided which alters this operation during a bad or low voltage discharge. This check circuit is triggered by the zener diode 78. This diode has a breakdown voltage below a minimum acceptable discharge voltage level. If the discharge is good, zener diode 78 will conduct and drive transistor 80 into conduction which operates to hold transistor 74 in its nonconductive state. However, if after breakdown the discharge voltage drops to a value below the predetermined minimum, the zener diode 78 stops conducting. Therefore conduction through transistor 80 terminates thus driving transistor 74 into conduction and ending any noise detection during that discharge.

In FIG. 4b transistors 82 and 84 comprise a discrete component logic and gate. The gate is only open or fully conductive in the presence of a good discharge pulse as detected by zener diode 78 and a noise signal as indicated by transistor 70 going into conduction. On the output of the gate or in the collector circuit of transistor 82 is a photon coupled isolator 86. The isolator 86 is comprised of an emitter 88 or source of photons and a receiver 90. When the emitter 88 is nonconducting, the resistance of the receiver 90 is relatively high. However, when there is conduction through the emitter 88, and the receiver 90 receives the emitted photon energy, its resistance begins to decrease and does decrease as a function of the photon energy received. Under normal machining conditions, when noise is detected, transistors 82 and 84 are conducting, and consequently the resistance of the receiver 90 is minimal. The potential on the cathode of zener diode 85 is sufficient to hold it in its breakdown condition and drive transistor 87 into conduction. This provides a discharge path for the capacitor 91. When an arcing condition begins during a good discharge, the noise signal disappears and transistor 82 stops conducting thus terminating photon emissions from the emitter 88. The resistance of the receiver 90 increases, and the potential on the cathode of zener diode 85 decreases thus terminating conduction through the transistor 87. The capacitor 91 begins to charge and builds up to the breakdown voltage of zener diode 92 in a time determined by the magnitude of the capacitor 91 and resistor 89. It is readily apparent that the logic gate comprised of transistors 82 and 84 detect noise on a per discharge basis; however, the EDM process is one which is highly unpredictable. In many cases an arcing condition may start; but due to the other dynamic conditions of the process, e.g. flow rate, dielectric conductivity, etc., the arcing condition may clear itself. In such a situation, it would be unnecessary, and in fact, detrimental to the efficiency of the process to take an immediate remedial action for alleviating the arcing condition; therefore, in the preferred embodiment, applicant proposes to wait for several discharges to give the process an opportunity to clear itself naturally. This is the function of the isolator 86. The isolator has a relatively long time constant. In other words, when the noise disappears, the time required for the receiver resistance to increase to a point where conduction is terminated in transistor 87 is sufficient to permit a number of discharges to occur. If the condition does not clear itself, conduction through transistor 87 is terminated and the potential across the capacitor 91 builds up until the zener diode 92 goes into conduction. This action drives transistors 92 and 94 into conduction. Conduction through transistor 96 causes the emitter 100 of the photon coupled diode 98 to emit photons. The receiver 102 is responsive to photon emission and permits conduction in the reverse direction, thus producing an output from the noise detector 18. The photon coupled diode 98 is used to electrically isolate the noise detection circuit 18 from the pulse energy control 22. In the energy control 22, transistors 104 and 106 are connected in the well-known Schmidt trigger configuration. When a signal is received in the base circuit of transistor 104, the Schmidt trigger operates to provide a very fast switching action. Therefore, transistor 106 rapidly terminates conduction and provides an input to transistor 108 driving it into conduction. Transistor 108 operates as inverter amplifier and performs two functions. It energizes the OFF time and ON time switches comprised of transistor 110 and 112 in FIG. 4c and initiates a one-shot multivibrator. Transistors 110 and 112 provide an output from the pulse energy control 22 and produce a predetermined ON and OFF time that substantially reduces the energy magnitude per machining pulse. The ON time is determined by the potentiometer 116 and the OFF time by potentiometer 114. The potentiometers 114 and 116 are located in the pulse source 24 which is a part of the power supply 16. Since they are the only elements affected, the potentiometers 114 and 116 are broken out of the pulse source circuit as a whole and are the only elements shown. When the transistor 108 is driven into conduction a signal is supplied to the base circuit of transistor 110a which drives it into conduction. This results in conduction being terminated in transistor 110b, and resistor 118 is placed in series with the potentiometer 114 thus substantially increasing the OFF time. Simultaneously, the conduction of transistor 108 results in conduction through transistor 112 which operates as a low resistance shunt around potentiometer 116 thus substantially reducing the ON time. Therefore, machining now occurs at a substantially reduced energy level. The reduced energy level facilitates the machining and removal of the impurities deposited on the tool and workpiece which cause the arcing condition. AFter a period of time, the impurities will be removed, and the arcing condition will disappear. The noise signal will again appear on the voltage signal during a discharge, and the output from the noise detector 18 is terminated. Further, conduction through transistor 108 causes transistor 120 to conduct. Transistor 120 provides a drive for a one-shot multivibrator which is comprised of the Darlington pairs 122 and 124. Upon initiation by transistor 120. The Darlington pair 124 stops conducting and the collector 125 goes to a more positive potential. This signal is fed back to the input of transistor 104 and locks transistor 104 in its conductive state. At the end of the time determined by potentiometer 126 and the capacitor 128, the Darlington pair 124 switches into conduction which causes the collector 125 to go less positive. Transistor 106 will switch back into conduction as will transistor 110b, thus removing resistor 118 from the circuit of potentiometer 114. Likewise transistor 112 will terminate conduction thus restoring the ON time determined by potentiometer 116. Hence, the machining process resumes in its normal manner having machining pulses of the full selected energy level.

It should be noted that FIG. 4c indicates mechanical connection between potentiometers 116 and 126. Typically, the potentiometer 116 will provide a 100:1 range of ON times. It is inefficient to reduce the pulse energy for the same amount of time for all values of ON time. Therefore, the potentiometers 116 and 126 are ganged together so that the time duration of the output of the Darlington pair 124 is a function of the selected ON time at the time of the arcing condition. The larger the selected ON time the longer the output required from the Darlington pair 124 and vice versa.

While the invention is illustrated in some detail according to the preferred embodiments shown in the accompanying drawings and while the preferred illustrated embodiments have been described in some detail, there is no intention to thus limit the invention to such details. On the contrary, it is intended to cover all modifications, alternations and equivalents falling within the spirit and scope of the appended claims.

What is claimed is:

1. An EDM apparatus of the type comprised in part of a power supply producing periodic output machining pulses for generating electrical discharges across a machining gap formed between an electrically conductive tool and an electrically conductive workpiece, wherein the improvement comprises:
   a. means connected to the tool and workpiece for detecting the presence and absence of a noise signal during the discharges; and
   b. means connected between the detecting means and the power supply for modifying the production of the machining pulses in response to detecting the absence of the noise signal.

2. An EDM apparatus of the type comprised in part of a power supply producing periodic output machining pulses having a predetermined energy level for generating electrical discharges across a machining gap formed in a dielectric medium between an electrically conductive tool and an electrically conductive workpiece, wherein the improvement comprises:
   a. means electrically connected to the tool and workpiece for detecting the absence of a noise signal during the electrical discharges; and
   b. means connected between the detecting means and the power supply for changing the energy level of the machining pulses in response to detecting the absence of said noise signal.

3. An EDM apparatus of the type comprised in part of a power supply producing periodic output machining pulses having a predetermined energy level for generating electrical discharges across a machining gap formed in a dielectric medium between an electrically conductive tool and an electrically conductive workpiece, wherein the improvement comprises:
   a. means electrically connected to the tool and workpiece for detecting the absence of a noise signal during the electrical discharges;
   b. means connected between the detecting means and the power supply for changing the energy level of the machining pulses in response to the detection of the absence of the noise signal; and
   c. means connected between the detecting means and the power supply for terminating the production of the machining pulses.

4. The apparatus of claim 3 wherein the terminating means further comprises means for detecting the continuous absence of the noise signal over a predetermined period of time before terminating the machine pulses.

5. An EDM apparatus of the type comprised in part of a power supply for producing periodic output machining pulses having a predetermined ON time and a predetermined OFF time, said pulses generating electrical discharges across a machining gap, wherein the improvement comprises:
   a. a noise detector responsive to the electrical discharges across the machining gap for detecting the absence of a noise signal during an electrical discharge;
   b. a pulse energy control connected between the noise detector and the power supply for increasing the OFF time of the machining pulses and of the noise signal; and
   c. means connected between the noise detector and the power supply for terminating the production of output machining pulses in response to the detection of the continuous absence of the noise signal over a predetermined period of time.

6. The apparatus of claim 5 wherein the noise detector further comprises:
   a. means for producing a first signal upon detecting a predetermined voltage level of an electrical discharge;
   b. means for producing a second signal upon detecting the absence of the noise signal; and
   c. a gate circuit connected to said producing means for generating an output signal is response to said first and second signals.

7. An EDM process for removing metal having the steps of initiating a spark discharge across a machining gap, melting a volume of metal and terminating the spark discharge after a predetermined period of time commensurate with a predetermined energy level, wherein the improvement comprises:
   a. detecting the absence of a noise signal across the gap during the spark discharge; and
   b. reducing the energy level of succeeding spark discharges for a predetermined period of time.

8. An EDM process for removing metal having the steps of initiating a spark discharge across a machining gap, melting a volume of metal, and terminating the spark discharge after a predetermined period of time commensurate with a predetermined energy level, wherein the improvement comprises:
   a. detecting the absence of a noise signal across the machining gap during the spark discharge;
   b. reducing the energy level of succeeding spark discharges; and
   c. terminating the spark discharges upon detecting the continuous absence of the noise signal for a predetermined period of time.

* * * * *